Feb. 2, 1960 W. T. SELSTED ET AL 2,923,380

BRAKING MEANS FOR MAGNETIC TAPE APPARATUS

Filed May 7, 1956 2 Sheets-Sheet 1

INVENTORS
Joseph A. Dinsmore
Walter T. Selsted

BY

Flehr and Swain

ATTORNEYS

BRAKING MEANS FOR MAGNETIC TAPE APPARATUS

Filed May 7, 1956 2 Sheets-Sheet 2

INVENTORS
Joseph A. Dinsmore
Walter T. Selsted
BY
Fleher and Swain
ATTORNEYS 2,923,380

BRAKING MEANS FOR MAGNETIC TAPE APPARATUS

Walter T. Selsted, San Mateo, and Joseph A. Dinsmore, San Carlos, Calif.

Application May 7, 1956, Serial No. 583,024

3 Claims. (Cl. 188—166)

This application relates generally to braking means suitable for use with magnetic tape machines of the type used for recording or reproducing sound or other recordable frequencies.

Conventional magnetic tape machines employ a pair of turntables adapted to mount tape supply and take-up reels. Suitable capstan drive means engages the length of tape extending between the reels, and serves to feed the tape past a magnetic head assembly for recording or playback operations. Motive means associated with the turntables serves to wind up the tape on the take-up reel with proper tensioning of the tape being drawn from the supply reel. At certain times the tape is effectively disengaged from driving relation with the capstan, and the turntables operated at higher speeds of rotation for fast forward or rewind operations. At the end of such fast forward or rewind operations it is necessary to brake the reels without permitting any undue tape slack or any tape tension as might cause breakage. Considering the braking device for a single turntable, it should have braking torque which is suitable for example to brake the reel after high speed tape unwinding rotation, and a lesser toque to brake the reel against opposite direction. Assuming use in a conventional machine of the type described, duplicate braking devices can be provided for the two turntables whereby at the end of a high speed tape operation, the higher braking torque is applied to the turntable from which the tape is being supplied, and the second lesser braking torque applied to the turntable toward which the tape is moving. Aside from machines of the more conventional types, there are other magnetic tape machines where braking devices capable of providing two predetermined braking torques for opposite directions of rotation, find useful application.

The various types of braking devices that have been used in the past have had certain undesirable features. Particularly it has been difficult to provide predetermined amounts of braking torque for the two directions of rotation, having reference both to factory settings and field servicing. In addition prior devices have been lacking in smooth uniform braking effect, without jamming or other undesirable variations in braking torque. Also prior mechanisms have been relatively complicated compared to the braking means herein described.

In general it is an object of the present invention to provide improved braking means for magnetic tape machines that overcomes the disadvantages referred to above.

Another object of the invention is to provide a braking means of the above character in which the braking torque for the two directions of rotation is controlled separately by two different springs.

Another object of the invention is to provide braking means of the above character that is characterized by simplicity of construction, and which can be readily manufactured and assembled.

Another object of the invention is to provide braking means of the above character which can be used with a variety of magnetic tape machines, including the conventional type of machine previously described.

Another object of the invention is to provide braking means which can be used on both the supply and take-up turntables of conventional magnetic tape machines for securing the desired controlled braking following fast forward or rewind operations.

Additional objects and features of the operation will appear from the following description in which the preferred embodiment has been set forth in detail in conjunction with the accompanying drawing.

Referring to the drawing.

Figure 1:
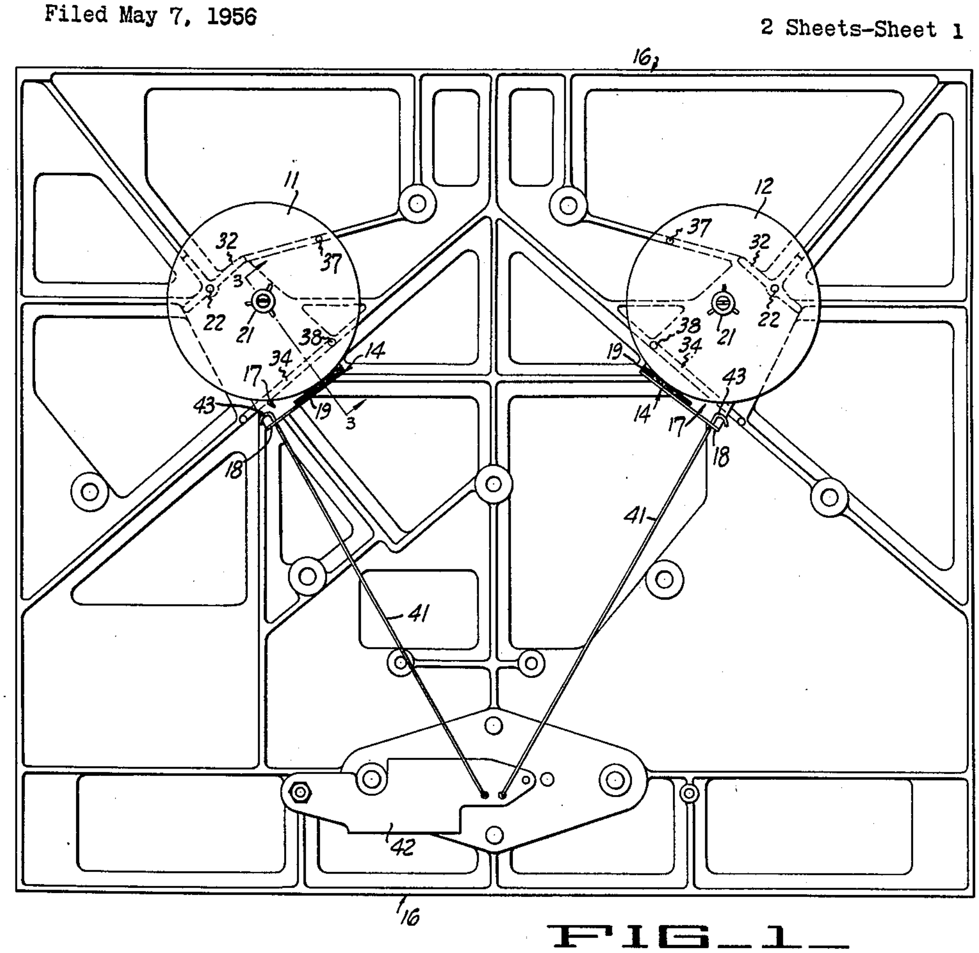
Figure 1 is a side elevational view schematically illustrating braking devices in accordance with the present invention, incorporated in a machine having both supply and take-up turntables.

Figure 1 schematically illustrates a magnetic tape machine having turntables 11 and 12 adapted to mount tape reels. Motive means (not shown) is associated with the turntables for providing the required torques for playback, recording, fast forward and rewind operations. Each turntable is shown provided with a flange 13 forming a brake drum, the outer periphery of which is engaged by the brake shoe 14 of the associated braking device.

Figure 2:
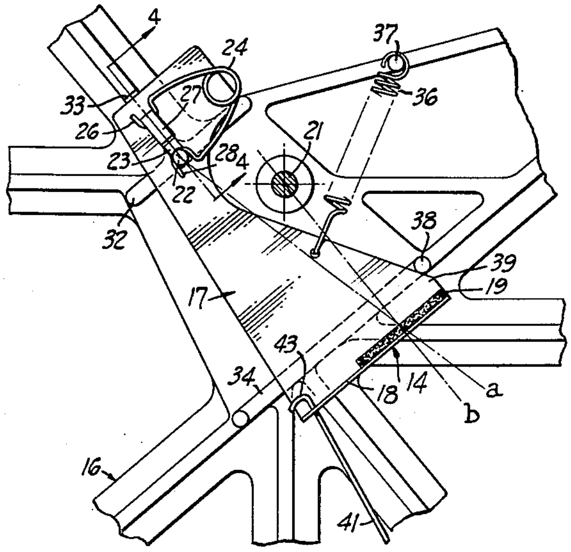
Figure 2 is an enlarged plan view showing one of the braking devices with the associated turntable and brake drum removed.
Figure 3:
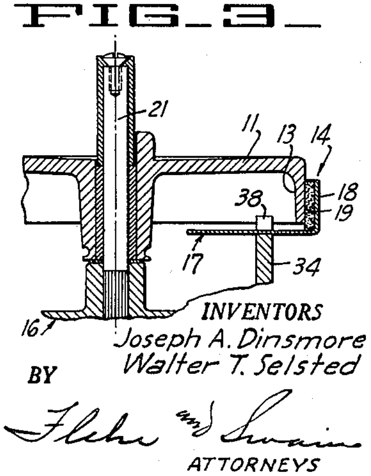
Figure 3 is a cross sectional detail on an enlarged scale, taken along the line 3—3 of Figure 1.
Figures 4, 5, 6, 7:
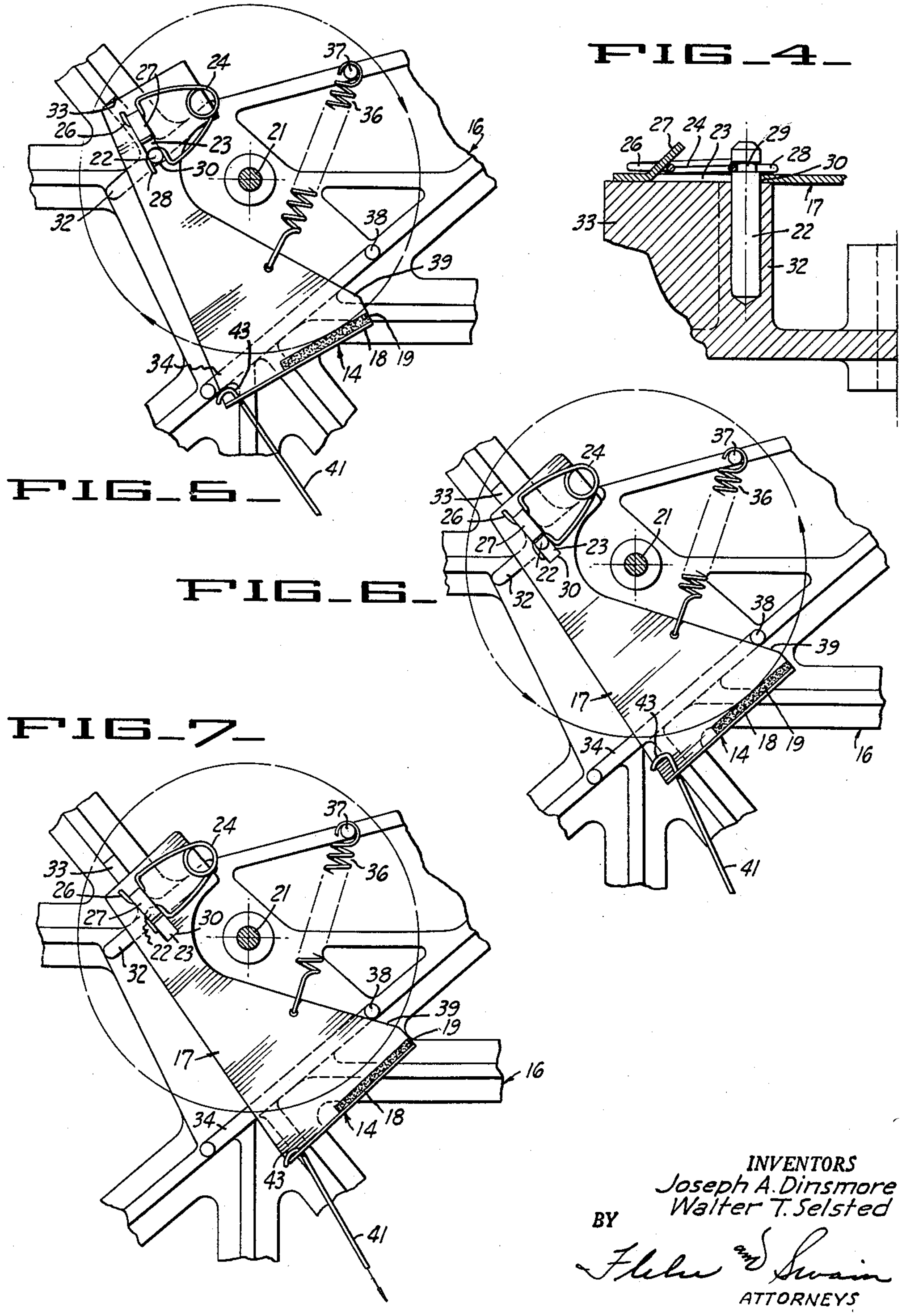
Figure 4 is an enlarged cross sectional detail taken along the lines 4—4 Figure 2.
Figure 5 is a schematic view similar ot Figure 2 showing the positioning of the parts for one direction of rotation.
Figure 6 is a view like Figure 5 but showing the positioning of the parts for the other direction of rotation.
Figure 7 is a view like Figure 5 but showing the positioning of the parts when the brake is completely released.

Figures 2 and 4 illustrate the various parts serving to carry the brake shoe 14 and to control the braking torque. The metal frame 16 of the machine serves to mount an arm 17, which generally underlies the associated turntable. The brake shoe may be formed as a flange 18 on one end of the arm, and which serves to mount a pad 19 formed of felt or other suitable friction material. The arm 17 is disposed generally in a plane at right angles to the turntable shaft 21.

Means is provided for connecting that end of the arm remote from the shoe 14 to the frame 16, whereby the shoe and arm may move in a direction generally radial with respect to the axis of shaft 21, and in a second direction substantially at 90° with respect to the first direction. In addition separate springs are provided for urging the arm and shoe in each of the two directions. The particular connecting means illustrated consist of a pin 22 that is carried by the frame 16, and which is accommodated in a slot 23 formed in the arm. One of the springs 24 is in the form of a spring wire bow, having its one extremity 26 engaged with the tab 27 on the arm, and its other extremity 28 engaged in a groove 29 formed in the pin 22. Thus spring 24 urges the shoe 14 toward the shaft 21 and to a limiting position in which the pin 22 is in engagement with that portion 27 of the arm, at the end of the slot 23. Thus the pin not only forms retaining means between the arm and a fixed support, but in addition forms together with the arm portion 30 stop means for limiting movement of the arm in the direction in which it is urged by the spring 24.

The general location of the arm and its connecting means with respect to the turntable shaft 21, is such that the line of centers *a* from the connecting means to the medial portion of the brake shoe, forms an acute angle with respect to the line of centers *b* drawn from the axis of shaft 21 to the medial portion of the shoe. Also as shown in Figure 2 the shoe extends substantially at right angles to the line of centers *b*.

The lower side of the arm in the vicinity of the pin 22, rests loosely upon the adjacent edges of the supporting ribs 32 and 33. The end of the arm that mounts the shoe 14 is also shown resting upon the upper edge of the rib 34.

A second tension spring 36 has its one end attached to arm 17, and its other end secured to the fixed anchorage point 37. A second stop means is provided to limit movement of the arm against the urging of spring 36, and consists of a pin 38 which engages the portion 39 on the arm. It will be noted that the direction of pull of spring 36 is generally at right angles to the direction of thrust of the spring 24. Also the pull of spring 36 tends to cause pivotal movement of the arm about the pin 22.

Assuming that two braking devices are to be used, one for each turntable, they can be connected to a common means as shown in Figure 1. In this instance the wires are rods 41 loosely connected with the arms 17, and with a common operating member in the form of a pivoted arm or lever 42. This arm may be operated manually, by means of a solenoid, or by any other means provided in the machine to release the braking devices. As shown in Figure 2 each of the rods 41 may extend loosely through an opening in the corresponding flange 18, and a head 43 is formed on the end of the rod whereby when the rod is pulled in the direction indicated by the arrow in Figure 7, head 43 is brought into engagement with flange 18 to move the entire arm to retract the shoe 14 from the periphery of the brake drum. For the normal brake operating positions of the arm 17, the head 43 is in spaced relationship with the flange 18 whereby the rod 41 does not interfere in any way with the action of the arm.

Operation of the braking means described above is as follows: Assuming that the brake drum is removed from the shaft 21, the arm takes the position shown in Figure 2. The portion 30 of the arm is in abutment with the pin 22, thus taking the thrust of spring 24, and the arm portion 39 is in abutment with the stop pin 38, thus taking the thrust of tension spring 36. When the brake drum is applied to the shaft 21, the arm 17 occupies a position in which arm portion 30 remains in abutment with pin 22, but arm portion 39 is spaced from the stop pin 38. Thus under such static conditions the spring 36 yieldably urges the arm toward the stop pin 38, and presses the shoe 14 into frictional engagement with the brake drum. Assuming now that the brake drum is rotated clockwise as indicated in Figure 5, the brake is self relieving in its action, and at the commencement of such rotation a small amount of clockwise pivotal movement of arm 17 takes place and thereafter the shoe is held in frictional contact with the brake drum by the tension of spring 36. The strength of the spring 36 determines the amount of braking torque applied. By factory service adjustments of the strength of this spring, the braking torque for that direction of rotation can be adjusted accordingly. The braking torque remains substantially constant and independent of variations in the coefficient friction which may occur during usage. For counter-clockwise rotation of the brake drum, the parts assume the positions shown in Figure 6. At the commencement of counter-clockwise rotation from a static condition, the arm 17 pivots in a counter-clockwise direction together with rotation of the drum, and such pivotal movement is accompanied by some sliding movement of the arm relative to the pin 22 and against the tension of the spring 24. Such counter-clockwise pivotal movement of the arm (in conjunction with counter-clockwise rotation of the brake drum) continues until the arm has moved a sufficient angular distance to bring portion 39 into abutment with pin 38. Thereafter the tension of spring 36 is taken by this abutment means, and spring 24 alone serves to yieldably urge the brake shoe against the drum. Due to the positioning of the shoe and the location of the arm relative to the drum, there is a substantial amount of servo effect for counter-clockwise rotation. The strength of the spring 24 now determines the amount of braking torque for continued counter-clockwise rotation. In general it is desirable that this torque be substantially greater than the torque for clockwise rotation. Here again the amount of braking torque can be factory or field adjusted by changing the strength of the spring 24.

When the associated operating rod 41 is pulled by operation of member 42, the brake is completely released by movement of the shoe 14 away from the brake drum in the manner shown in Figure 7.

Assuming the use of two braking devices in the manner illustrated in Figure 1, the operation of each device is the same as described above except that the braking device for turntable 12 is arranged to have its greatest torque for clockwise rotation. Therefore when both braking devices are applied at the end of a fast forward or rewind operation, the braking devices when applied simultaneously supply greatest torque for the turntable from which the tape is leaving, thus keeping tape tension while the two turntables are decelerating.

It will be evident from the foregoing that I have provided a braking device which has useful application for various types of magnetic tape machines. The mechanical construction is relatively simple, and a predetermined amount of braking torque can be provided for the two directions of rotation. The braking action is relatively uniform and completely free of jamming.

This application is a continuation in part of our copending application Serial No. 297,499, filed July 7, 1952, now abandoned.

We claim:

1. Braking means for magnetic tape apparatus of the type having a turntable serving to mount a magnetic tape reel, comprising a brake drum for rotation coaxially with the turntable, a brake shoe for frictionally engaging a peripheral surface of the drum, mounting means, an arm having said shoe secured to one end portion of the same, said arm being connected at its other end portion to the mounting means for movement relative to the mounting means in either one of two directions and in a plane adjacent to and parallel to the general plane of the drum, the first direction being generally longitudinally of the arm and the second direction being generally radial with respect to the axis of the drum, a first spring connected between the mounting means and the arm to urge the shoe and the arm in said first longitudinal direction whereby normally the shoe is yieldably pressed against the adjacent surface of the drum, said mounting means and the connection of the same with said other end portion of the arm forming a first stop means for limiting movement of the arm toward that part of the mounting that is adjacent said other end portion of the arm and in said first longitudinal direction, a second spring connected between the mounting means and the arm to yieldably urge the shoe in said second radial direction, a second stop means on the mounting means for limiting movement of the shoe toward the axis of the drum and in said second direction, said arm being disposed to extend generally chordally to the drum periphery and offset from the axis of the drum, whereby for rotation of the drum in one direction the arm is moved to engage said first stop means and the second spring means urges the shoe into frictional engagement with the drum and whereby for rotation of the drum in the opposite direction the arm is moved to engage said second stop means and said first spring urges the shoe into frictional engagement with the drum.

2. Braking means as in claim 1 in which said one end of the arm has a pin and slot connection with the mounting means, said pin and slot connection forming said first stop means.

3. Braking means as in claim 2 in which said pin and slot connection consists of a slot formed in the arm and a pin secured to the mounting means and accommodated within such slot, and in which said first named spring is in the form of a spring wire bow having one end of the same connected to the arm and the other end of the same engaging said pin, said bow retaining said arm in assembled relation with respect to said pin.

References Cited in the file of this patent

UNITED STATES PATENTS

| | | |
|---|---|---|
| 2,555,643 | Harrison | June 5, 1951 |
| 2,625,337 | Wiliams | Jan. 13, 1953 |

FOREIGN PATENTS

| | | |
|---|---|---|
| 868,088 | Germany | Feb. 23, 1953 |